(12) United States Patent
Redmon et al.

(10) Patent No.: US 11,494,862 B2
(45) Date of Patent: *Nov. 8, 2022

(54) MOBILE LEGAL COUNSEL SYSTEM AND METHOD

(71) Applicant: Redmon Jeang LLC, Parker, TX (US)

(72) Inventors: Clayton K. Redmon, Grand Prairie, TX (US); Wei Wei Jeang, Parker, TX (US)

(73) Assignee: Redmon Jeang LLC, Parker, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,884

(22) Filed: Oct. 22, 2021

(65) Prior Publication Data

US 2022/0044339 A1 Feb. 10, 2022

Related U.S. Application Data

(63) Continuation of application No. 15/688,764, filed on Aug. 28, 2017, which is a continuation-in-part of
(Continued)

(51) Int. Cl.
| | |
|---|---|
| *G06Q 50/18* | (2012.01) |
| *H04N 7/15* | (2006.01) |
| *H04W 4/02* | (2018.01) |
| *H04L 67/306* | (2022.01) |
| *H04N 7/14* | (2006.01) |

(Continued)

(52) U.S. Cl.
CPC ....... *G06Q 50/182* (2013.01); *H04L 65/1069* (2013.01); *H04L 67/306* (2013.01); *H04L 67/52* (2022.05); *H04L 67/535* (2022.05); *H04N 7/147* (2013.01); *H04N 7/15* (2013.01); *H04N 7/155* (2013.01); *H04W 4/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0002469 A1* | 1/2002 | Hillstrom | ............... | G06Q 10/10 707/999.107 |
| 2011/0119197 A1* | 5/2011 | Turchin | ................. | G06Q 10/10 715/781 |

(Continued)

*Primary Examiner* — Phung-Hoang J Nguyen
(74) *Attorney, Agent, or Firm* — Wei Wei Jeang; Grable Martin Fulton PLLC

(57) ABSTRACT

A Mobile Lawyer system includes a 360 degree HD video camera configured for mounting on a vehicle; a display screen configured for mounting inside the passenger compartment of a vehicle; and a Mobile Lawyer App downloaded and installed on a mobile telephone in communication with the video camera and display screen, configured, upon command from a user, to notify an attorney located remotely via a cellular and/or computer network, and to display a video image of the remote attorney on the display screen (or the screen of the mobile telephone), and to live-stream a 360 degree video captured by the video camera to the Internet for viewing by the remote attorney and for cloud storage. The introduction of a lawyer on-demand into a police encounter can help to defuse and de-escalate the situation. The lawyer can serve as a live observer, witness, and intermediary who can provide live legal guidance to the user.

20 Claims, 3 Drawing Sheets

Related U.S. Application Data application No. 15/644,524, filed on Jul. 7, 2017, now Pat. No. 11,443,395.

(60) Provisional application No. 62/364,300, filed on Jul. 19, 2016.

(51) Int. Cl.
*H04L 65/1069* (2022.01)
*H04L 67/52* (2022.01)
*H04L 67/50* (2022.01)

(56) References Cited

U.S. PATENT DOCUMENTS

| | | | | |
|---|---|---|---|---|
| 2015/0172561 | A1* | 6/2015 | Lee | H04M 1/03 |
| | | | | 348/584 |
| 2015/0371456 | A1* | 12/2015 | Moore, Jr. | G01S 19/13 |
| | | | | 701/1 |
| 2016/0061625 | A1* | 3/2016 | Wang | G01C 21/3697 |
| | | | | 701/454 |
| 2016/0182707 | A1* | 6/2016 | Gabel | G06Q 10/10 |
| | | | | 455/404.2 |
| 2016/0295197 | A1* | 10/2016 | Hudman | H04N 13/254 |
| 2017/0053169 | A1* | 2/2017 | Cuban | G06V 20/53 |
| 2017/0054770 | A1* | 2/2017 | Wells | H04L 65/65 |
| 2018/0367820 | A1* | 12/2018 | Abulikemu | H04N 21/218 |

* cited by examiner

MOBILE LEGAL COUNSEL SYSTEM AND METHOD

RELATED APPLICATION

This is a Continuation of U.S. application Ser. No. 15/688,764 filed Aug. 28, 2017, which is a Continuation-in-Part application of U.S. application Ser. No. 15/644,524 filed Jul. 7, 2017, which claims the benefit of U.S. Provisional Patent Application No. 62/364,300 filed on Jul. 19, 2016, all of which are hereby incorporated by reference in their entirety.

FIELD

This disclosure relates to mobile software applications, and more particularly to a mobile legal counsel system and method, so that an attorney can be summoned quickly and virtually whenever a need arises to serve as a third-party observer, help defuse the situation, run interference, and provide legal advice.

BACKGROUND

According to a U.S. Department of Justice Special Report, in 2011, over 62.9 million U.S. residents had one or more contacts with police. Of these contacts, over 31 million were involuntary, and 13 million are in the context of traffic stops. Relatively more black drivers (13%) than white (10%) and Hispanic (10%) drivers were pulled over in a traffic stop. In these traffic stop incidents, about 1.2 million people felt that the police officer involved did not behave properly. However, only a small fraction, or 4.4% of these people filed a police complaint, and more than 1.1 million people did not. About 19% of persons involved in street stops were searched or frisked by police. The majority of these people did not believe the police had a legitimate reason for the search.

According to data compiled by The Washington Post, white people make up roughly 62 percent of the U.S. population but only about 49 percent of those who are killed by police officers. African Americans, however, account for 24 percent of those fatally shot and killed by the police despite being just 13 percent of the U.S. population. These numbers mean black Americans are 2.5 times as likely as white Americans to be shot and killed by police officers. U.S. police officers have shot and killed the exact same number of unarmed white people as they have unarmed black people: 50 each. But because the white population is approximately five times larger than the black population, unarmed black Americans were five times as likely as unarmed white Americans to be shot and killed by a police officer. https://www.washingtonpost.com/news/post-nation/wp/2016/07/11/arent-more--white-people-than-black-people-killed-by-police-yes-but-no/?utm term=.71a68e6da5fe Some argue that police shooting is racially-based, but there are evidence that show these police officers who commit these atrocities may be motivated by unconscious or implicit bias. There are research studies that support the notion that police professionals use more force, or be quicker to use force, against blacks due to a black-crime implicit bias producing greater perceptions of threat. Studies also support that implicit bias, once recognized, can be counteracted with repeated and intentional training and learning. However, implicit or explicit, the result is still the same—loss of innocent lives.

Whether white or black, implicit or explicit bias, there is a desire to defuse and de-escalate tense situations between the police and members of the general public if the loss of innocent lives can be avoided or reduced.

DETAILED DESCRIPTION

For many African Americans living in the United States, the threat of police brutality and shooting is an everyday reality. Black parents have "The Talk" with their children not of the birds and the bees, but how they must be obedient and compliant whenever they encounter the police.

Police brutality and killing is a deeply-rooted problem that cannot be easily and quickly addressed without multi-pronged persistent efforts. The concept described herein is an effort to introduce technology as one immediate solution to this problem. This concept uses technology to introduce the presence of a third party, a licensed attorney, into a police encounter. The licensed attorney can serve as a live observer, witness, and intermediary who can help to de-escalate and defuse the situation.

Figure 1:
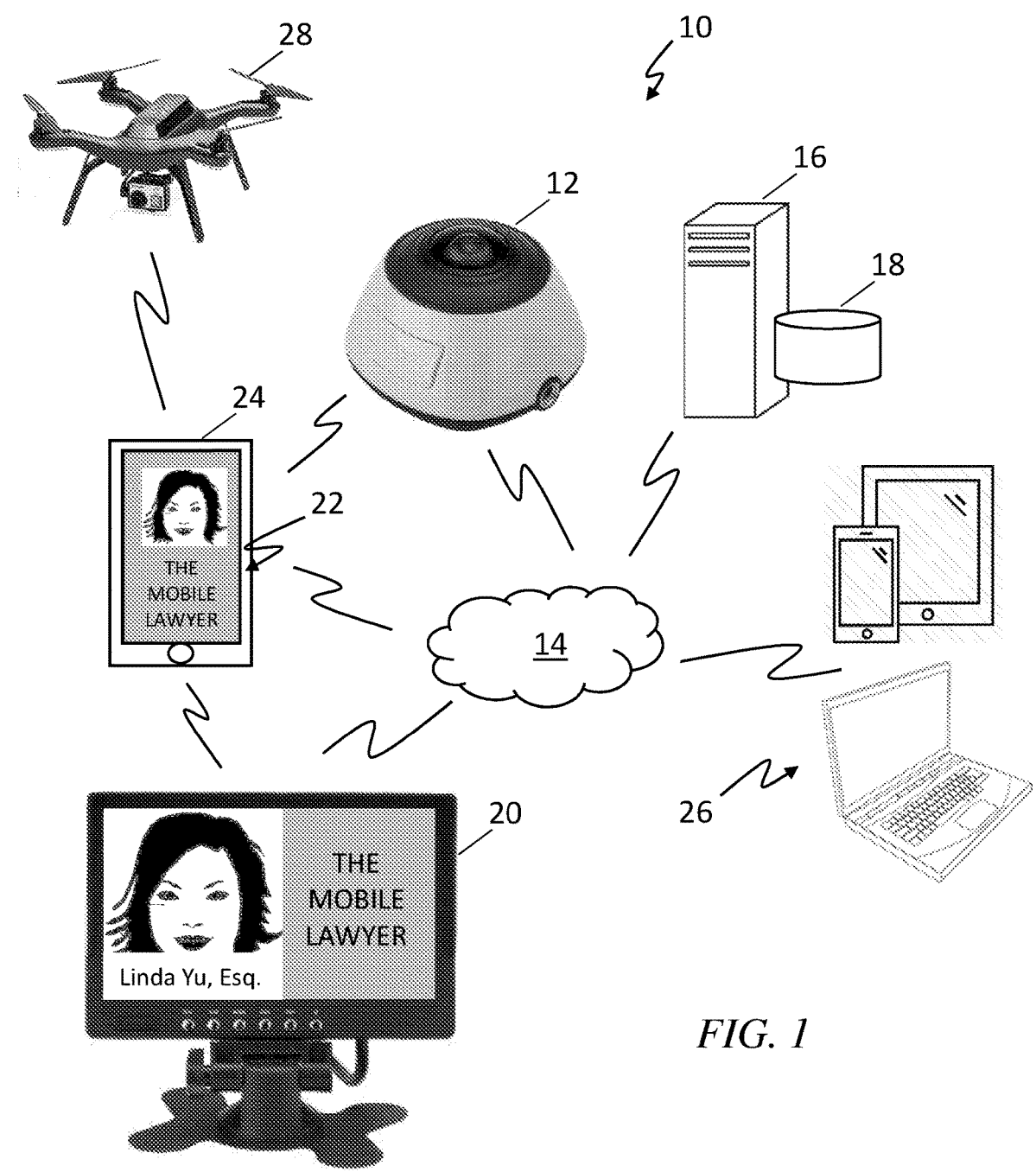
FIG. 1 is a simplified diagram of an exemplary embodiment of a system and method for mobile legal counsel according to the teachings of the present disclosure.

FIG. 1 is a simplified diagram of an exemplary embodiment of a system and method for mobile legal counsel 10 according to the teachings of the present disclosure. The system 10 includes a 360-degree video camera 12 that can live-stream 360 degrees of video data with accompanying audio data over the Internet and/or cellular network 14. The 360-degree camera 12 is preferably high definition and designed for mounting on the dash of a vehicle so that it can capture unobstructed video images of a user seated in the driver's seat as well as the front passenger seat of the vehicle. An example of such a camera is a 1080p sports action camera, Chinavasion product code CVLM-DV141. Alternatively, the 360-degree camera may be mountable to the user's mobile device itself, and utilize its cellular and Internet connectivity to live stream video data. In another alternate embodiment, a mobile device that has a built-in 360-degree camera can be employed. In an alternate embodiment, the 360-degree camera 12 is joined by additional video cameras mounted at different points of the user's car, inside and/or outside the passenger compartment, to capture video footage from various vantage points to avoid obstacles that may block the view, such as some parts of the car or passengers in the car. The mobile lawyer app may incorporate images captured by OEM cameras on the vehicle. In yet another embodiment, a drone-based video camera 28 can be used to augment the live-streamed video data from an overhead vantage point. It is contemplated that the drone can be remotely controlled by either the user, a remote administrator, or the remote lawyer. Additionally, the remote administrator and/or lawyer may also be able to remotely control one or more other video cameras mounted inside and/or outside the passenger compartment. One or more of these cameras may additionally have infrared capability to capture clear images in low ambient light conditions.

In certain applications, the mobile lawyer app may employ video images captured by cameras native on a mobile device, such as the front and back-facing cameras on a mobile telephone. For example, if the mobile lawyer app is initiated and it detects that an externally-mounted 360-degree camera is not available, then it may automatically initiate operation of the built-in cameras.

All of the captured live-stream video data (including audio) are transmitted (using cellular/Internet connectivity of the mobile device, the camera, or the vehicle) via a global computer network (Internet) and/or cellular mobile telephone network 14 to a remote server 16 and stored in a database 18, preferably encrypted to ensure privacy. The database 18 further stores the identities, credentials, states where licensed, contact information (e.g., address, email address, and mobile telephone number), and other information of lawyers licensed in various jurisdictions who have been vetted and contracted to be on call during certain days, time periods, and other work parameters to provide mobile lawyer services. The system 10 further includes a dash-mounted display monitor 20 such as the seven-inch LCD display, Chinavasion product code CVABR-LT298. A user may download and install the Mobile Lawyer App 22 onto his mobile phone 24 or another mobile device, such as a wearable device, for example. The video camera 12 and display screen 20 may directly communicate wireless to the server 16 and database 18 via the Internet/cellular network or via the mobile device 24. It is contemplated that the drone may be controlled by administrators or other employees of the mobile lawyer service and/or the remote lawyer.

In operation, the user may initialize the Mobile Lawyer App 22 by setting up a profile with the name, address, phone number, age, sex, race, emergency contact, medical information, and other basic information. The user may become a subscriber by agreeing to make monthly subscription payments to retain the services provided via the Mobile Lawyer App 22. There may be multi-tiered services available tied to different subscription payment amounts. For example, the user may enter into an agreement to pay $9.99 per month for the basic service level and $29.99 per month for a premium service level. The service levels may differ in the amount of coverage in terms of, e.g., hours and jurisdiction. Once becoming a subscriber, the user is issued one or more stickers or decals that can be displayed on the vehicle (on the bumper, in the rear window, in the driver side window, etc.) to clearly mark and identify the user/driver as one that is protected by the Mobile Lawyer App 22.

The user may initiate a Mobile Lawyer Consultation Session and live-stream video capture by the camera(s) by sending a request via the Mobile Lawyer App 22 on his/her mobile device 24. Once the request to live-stream video is received at the server 16, an alert notification is sent to one or more lawyers licensed in the same jurisdiction as the current location of the user. The alert notification may be in the form of a call, text message, email, and another form of message transmitted to and presented on a computing device 26, such as a mobile phone, tablet computer, and laptop computer that is equipped with a video camera. The first lawyer who responds first to handle the consultation session can immediately view the live-streamed video information on a computing device. One or more different criteria may also be used to select the responding lawyer. In a preferred embodiment, the lawyer interfaces with the system 10 via a web browser-based interface. As soon as a lawyer is assigned to handle the consultation session, his/her image as captured by his/her computing device 26 (transmitted via the cloud 14) along with his/her name is displayed on the dash-mounted monitor 20 in the user's vehicle. Alternatively, if the user does not have a dash-mounted display monitor, the lawyer's image is displayed by the user's mobile device 24. In another alternate embodiment, a still image of the selected lawyer stored in the database may be displayed on the display monitor or mobile device if the lawyer is not able to participate via video.

The Mobile Lawyer App 22 has GPS and mapping capabilities, or alternatively has access to these functions of the mobile phone, so that it may be able to pinpoint the location of the user and relay this information to the server 16 so that this information may be used in selecting lawyers who may respond to the alert notification. When GPS is not available, location may be determined by triangulation of cellular towers that are in communication with the user's mobile device.

Figure 2:
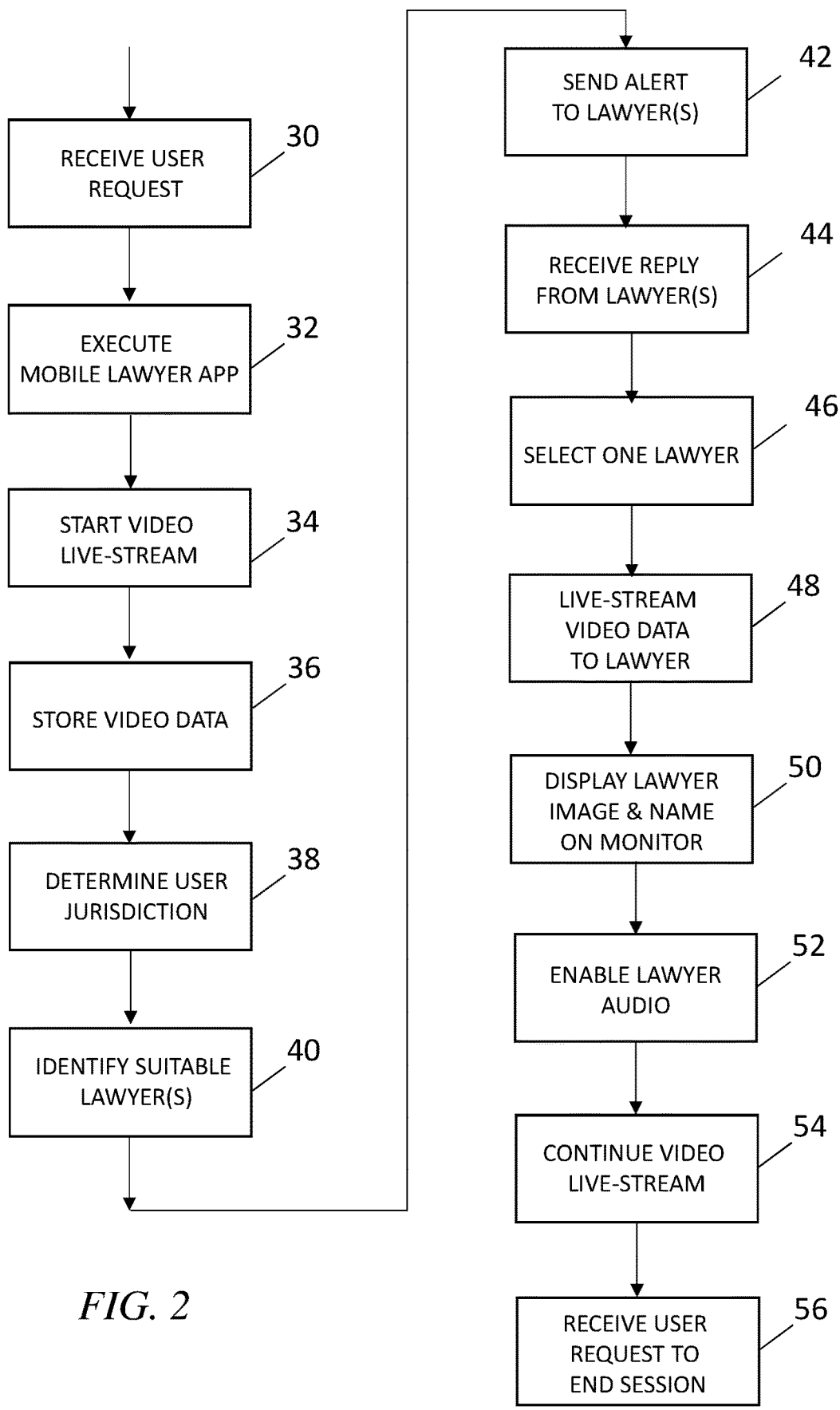
FIG. 2 is a simplified flowchart of a system and method for mobile legal counsel according to the teachings of the present disclosure.

Referring to FIG. 2, a simplified flowchart of the mobile lawyer system and method is shown. In blocks 30 and 32, a request from the user is received by the mobile device to execute the Mobile Lawyer App. The user may click a button, use a verbal command, or turn on the 360-degree camera to initiate the consultation session. The video camera begins to capture video images inside and outside the vehicle and transmits the captured images in real-time to the remote server and database for storage, as shown in blocks 34 and 36. A determination is made as to the location of the user/vehicle, such as the city and state, as shown in block 38. In response to the location of the user (i.e., jurisdiction), and possibly other criteria (e.g., ranking or rating of lawyers), one or more lawyers are selected and alerts are transmitted to their respective computing devices, as shown in blocks 40 and 42. One or more responses are received from the lawyers, and one is selected, as shown in blocks 44 and 46. The captured video data is immediately transmitted to the lawyer's associated computing device, as shown in block 48. The lawyer's computing device also captures video images of the lawyer and transmits it to the remote server, which in turn streams it to the display monitor located inside the user's vehicle, as shown in block 50. Audio data captured of the lawyer are also transmitted to the user via either the display monitor or the user's mobile device, as shown in block 52. In this manner, the lawyer has become a third-party observer in a police encounter.

The following is an exemplary scenario in which the Mobile Lawyer App 22 can be used. The user, driving his car, sees that a police squad car is behind him with its lights flashing. The user pulls the car to the side of the road, and upon stopping the car completely, immediately clicks on the Mobile Lawyer App icon displayed on the screen of his mobile phone 24 to execute the app. Alternatively, the Mobile Lawyer App 22 can be initiated by a verbal command or by turning on the 360-degree camera. The user also connects the phone to the 360-degree camera and optionally to the display screen (via wireless or hard connections). The execution of the Mobile Lawyer App 22 turns on the 360-degree camera 12 and begins live-streaming video data either directly via the Internet/cellular network or via the mobile device 24. The server 16 also receives the request from the user and selects one or more licensed lawyers to send an alert notification. The notification may be done via the attorney's own mobile phone or computer, in the form of text message, a phone call, or another form of alert. The first lawyer who responds immediately has access to the live-streaming video data. Additionally, the lawyer's image is also immediately displayed on the dash-mounted monitor 20. Alternatively, the same can be displayed on the screen of the mobile phone. Because the 360-degree camera 12 is mounted and positioned to optimally capture the actions of the user/driver as well as the police officer that steps up to the car and standing by the driver's side door, the remotely-located lawyer can clearly see what is happening. Because of the 360-degree nature of the video camera, the actions of any passenger in the car and activities that occur around the vehicle can be clearly captured. The lawyer's speech can be relayed by a display screen that has audio speaker capability or through the speakers on the user's mobile phone. The lawyer's image is identified by name and other information that clearly identifies him/her as a licensed attorney for the jurisdiction in which the user is located. The licensed attorney can have a 360-degree view of the scene by accessing the live streamed video from the video camera. Video data from additional camera angles from above and other vehicle-mounted and/or drone-mounted cameras are also live-streamed to the lawyer's computing device. The live streamed video is, at the same time, stored in the cloud data storage 18.

By the time the police officer steps up to the driver's side window, the display screen 20 shows the attorney's face and identification, and the video camera is capturing and live streaming video data. When the police officer first comes into view, the lawyer may choose to introduce him/herself to ensure that the police officer is aware of his/her presence. During the interaction between the police officer and the user, the attorney may remain silent and only act as an observer to allow the police officer to do his/her job without obstruction. However, the lawyer may interject if and when the situation demands it, such as when the police officer's demand or action is illegal under the laws of that jurisdiction. The lawyer may also provide guidance to the user to cooperate with the police officer and serve as a calming influence in a scenario that may be tense for all parties involved.

From the vantage point of the police officer, the presence of the lawyer as a third-party observer may also serve to alleviate concerns he/she may have about the user/driver and remove some of the tension. The police officer may be assured that the presence of the Mobile Lawyer means that the user will likely be compliant and not resist his reasonable demands. Further assurance is that fact that there will be a comprehensive video recording of the incident that can be used to verify either party's testimony.

Figure 3:
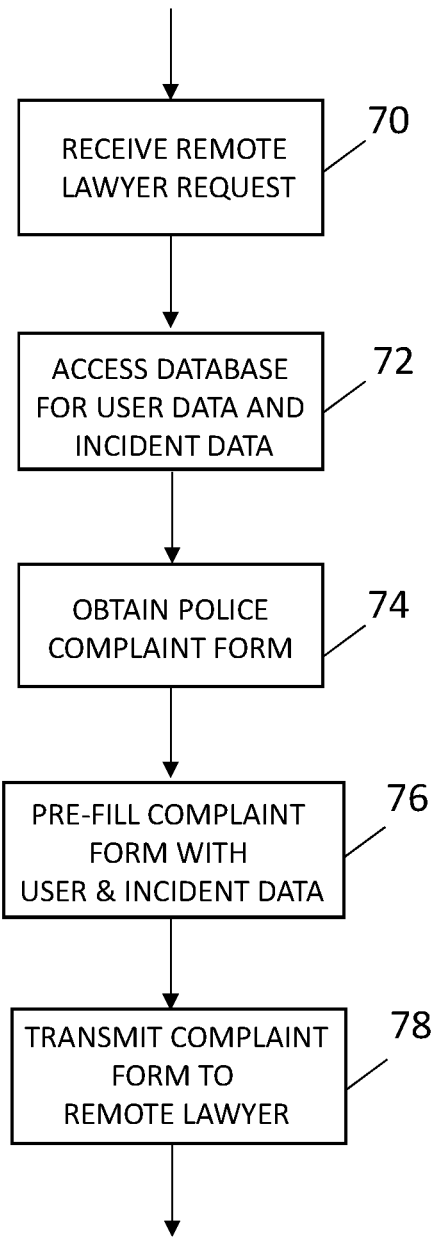
FIG. 3 is another simplified flowchart of a system and method for mobile legal counsel according to the teachings of the present disclosure.

The Mobile Lawyer may use the attorney functionalities provided by the app such as taking down extemporaneous notes regarding his/her observation of the activities. The attorney function also includes capturing and storing of the video of the attorney in cloud storage. Additionally, when the action of the police officer is improper and exceeds the limits of legality, the Mobile Lawyer may access a police complaint form that may auto-fill certain data fields such as the date, time, and location of the stop, etc. Referring to FIG. 3, the mobile lawyer may request to access a police complaint function, as shown in block 70. The server accesses the database to obtain data associated with the user, as well as data related to the incident, as shown in block 72. The server also obtains a template police complaint and pre-fills certain data fields with user data and incident data, as shown in blocks 74 and 76. For example, data fields such as user name, driver's license identifier, home address, age, sex, incident date, incident time, and incident location can be pre-filled on the complaint form. The complaint form is then transmitted to the remote mobile lawyer, as shown in block 78, so that it may be completed and submitted to the proper authorities to lodge a complaint.

It is the hope that the Mobile Lawyer technology described herein can provide a desperately needed calming and tempering presence that can be called upon whenever a police encounter occurs. Not unlike having a legal adviser along at all times, the Mobile Lawyer can be summoned to serve, observe, and provide legal guidance to the user in tense situations.

The lawyer selection criteria is primarily jurisdictional due to the licensing requirements for lawyers. Secondarily, users may rate lawyers and those lawyers with poor rating may receiver fewer or no opportunities to respond to consultation requests.

It should be noted that 360-degree camera described herein can be any camera that provides a wide field of view or a substantially panoramic field of view, and can include a single lens or multiple lenses. Multi-lens cameras capture multiple video streams that are stitched together by software. The term 360-degree camera should not be interpreted herein to strictly include cameras that capture exactly 360-degrees field of view. The "360-degree camera" can be stand-alone or built-into the mobile device and/or the vehicle, and can be in one housing or multiple housings. The output 360-degree video can be the result of multiple video streams stitched together to form the 360-degree view.

It should be noted that it is contemplated herein that the functionalities of the video camera and display monitor can be combined and integrated into one housing, so that one integrated device is dash-mounted with video camera and display capabilities, as well as communicating with the remote server, either directly via the Internet/cellular network or through the user's mobile device.

It should be understood that user's profile data, subscription information, and video data are protected by password and other security measures. Further, the lawyers' profile and credential information are also protected by password and other security measures. To access these data, the users and lawyers must supply the correct login information. It should be noted that the word "video" used herein is used to denote video and/or audio.

The features of the present invention which are believed to be novel are set forth below with particularity in the appended claims. However, modifications, variations, and changes to the exemplary embodiments described above will be apparent to those skilled in the art, and the system and method for Mobile Lawyer described herein thus encompasses such modifications, variations, and changes and are not limited to the specific embodiments described herein.

What is claimed is:
1. A mobile lawyer system, the system comprising:
   a remote server and a remote database;
   at least one video camera;
   at least one display screen;
   a mobile device executing a mobile application in communication with the at least one video camera and the at least one display screen, and configured, upon a one-click command from a user of the mobile device, to automatically and immediately communicate a current location of the mobile device to the remote server, the remote server being configured to:
   automatically search a plurality of information records associated with a plurality of lawyers stored in the remote database;
   automatically identify at least one lawyer licensed in a jurisdiction that correspond to the current location of the mobile device;

automatically transmit at least one notification to at least one computing device associated with the identified at least one lawyer;

receive an acceptance of engagement from a selected one of the at least one computing device associated with a selected one of the identified at least one lawyer; and automatically and immediately set up a bi-directional video communication session between the selected one of the at least one computing device associated with the selected one of the at least one lawyer and the mobile device, so that live video data of the user is automatically transmitted to the selected computing device associated with the selected lawyer and live video data of the selected lawyer is automatically transmitted to the at least one display screen;

automatically and immediately enable the at least one display screen to stream live video data of the selected lawyer, and the at least one video camera capture and stream live video of the user and surroundings to the computing device for viewing by the selected lawyer; and automatically and immediately enable live video data from the mobile device and the selected computing device to be transmitted to the remote server and database for secure storage.

2. The mobile lawyer system of claim 1, wherein the at least one video camera is selected from the group consisting of: at least one video camera mounted on a drone, at least one camera native to the mobile device, front and back-facing cameras native to the mobile device, at least one camera integrated and mounted on a vehicle, at least one camera mounted at various points of a vehicle, at least one camera with infrared capabilities, and at least one 360-degree video camera.

3. The mobile lawyer system of claim 1, wherein the mobile application is configured to:

automatically determine incident data comprising at least one of the user name, driver's license identifier, home address, age, sex, incident date, incident time, and incident location of captured video;

automatically transmit the incident data to the selected computing device associated with the selected lawyer having the live video communication session with the user; and automatically transmit the incident data to the remote server and database for secure storage.

4. The mobile lawyer system of claim 3, further comprising a lawyer app for execution on the computing device and configured to provide access by the at least one lawyer to user data and the incident data.

5. The mobile lawyer system of claim 4, wherein the lawyer app is further configured to include a police complaint function that automatically pre-fills certain data fields of a police complaint with the incident data.

6. A mobile lawyer method comprising:

receiving a live consultation request from a user's mobile device;

automatically and immediately initiating capture of images of the user and surroundings, and live-streaming the captured images to a remote server for encrypted storage via a computer network in response to receiving the consultation request;

automatically and immediately determining a current location of the mobile device;

automatically and immediately transmitting the current location of the mobile device to the remote server;

automatically searching, at the remote server, a plurality of information records associated with a plurality of lawyers stored in the remote database;

automatically identifying, at the remote server, at least one lawyer licensed in a jurisdiction that correspond to the current location of the mobile device;

automatically transmitting, by the remote server, at least one notification to at least one computing device associated with the identified at least one lawyer;

automatically receiving live-streaming video data of an identified remote lawyer licensed to practice law in a jurisdiction associated with the current location of the mobile device;

automatically live-streaming captured video images of the user to the at least one remote lawyer via the remote server;

automatically displaying the live-streaming video data of the identified at least one remote lawyer on a display monitor viewable by the user; and automatically storing the captured video data of the user and the at least one remote lawyer in a data storage device accessible by the remote server.

7. The mobile lawyer method of claim 6, wherein initiating capture of images of the user and surroundings comprises initiating a capture of video images by at least one video camera selected from the group consisting of: at least one video camera mounted on a drone, at least one camera native to the mobile device, front and back-facing cameras native to the mobile device, at least one camera integrated and mounted on a vehicle, at least one camera mounted at various points of a vehicle, at least one camera with infrared capabilities, and at least one 360-degree video camera.

8. The mobile lawyer method of claim 7, further comprising receiving remote control input of a flight path and position of the drone from the remote lawyer.

9. The mobile lawyer method of claim 6, further comprising receiving remote control input of viewing angle direction for the at least one video camera from the remote lawyer.

10. The mobile lawyer method of claim 6, wherein automatically determining a location of the user comprises accessing a GPS location of the user and determining a street address location from the GPS location.

11. The mobile lawyer method of claim 6, further comprising automatically searching, by the remote server, a database storing data associated with a plurality of lawyers, and automatically identifying at least one remote lawyer licensed in a jurisdiction that matches the current location of the user.

12. The mobile lawyer method of claim 11, wherein automatically identifying at least one remote lawyer comprises identifying remote lawyers with an approval rating level consistent with a level set by the user.

13. The mobile lawyer method of claim 6, further comprising providing secured access by the remote lawyer to user data and incident data comprising user name, driver's license identifier, home address, age, sex, incident date, incident time, and incident location, stored in the database.

14. The mobile lawyer method of claim 13, further comprising automatically pre-filling certain data fields of a police complaint form with data obtained from the database, including user name, driver's license identifier, home address, age, sex, incident date, incident time, and incident location.

15. A mobile lawyer system comprising:

a remote server and a remote database;

at least one video camera selected from the group consisting of: at least one video camera mounted on a drone, at least one camera native to the mobile device, front and back-facing cameras native to the mobile device, at least one camera integrated and mounted on a vehicle, at least one camera mounted at various points of a vehicle, at least one camera with infrared capabilities, and at least one 360-degree video camera;

a computing device having a display screen and executing a mobile application in communication with the at least one video camera, and configured, upon command from a user, to automatically determine a current location of the user, communicate with the remote server and notify at least one attorney located remotely, the at least one attorney being selected based on at least one of the attorney's licensure jurisdiction being consistent with the user's current location;

the remote server being configured to:
   automatically search a plurality of information records associated with a plurality of attorneys stored in the remote database;
   automatically identify at least one attorney licensed in a jurisdiction that correspond to the current location of the mobile device; and
   automatically transmit at least one notification to at least one computing device associated with the identified at least one attorney; and the display screen configured to automatically display a live video image of the remote attorney upon acceptance of notification by the at least one remote attorney, and the at least one video camera being configured to automatically capture images of an ongoing incident involving the user subscriber and live-stream the captured video of the user subscriber and surroundings for live viewing by the at least one remote attorney and for storage in the database.

16. The mobile lawyer system of claim 15, wherein the mobile application is configured to automatically determine incident data comprising the user name, driver's license identifier, home address, age, sex, incident date, incident time, and incident location of captured video and automatically store this information in the database.

17. The mobile lawyer system of claim 16, further comprising a lawyer app configured to provide access by the at least one remote attorney to user data and incident data in the database.

18. The mobile lawyer method of claim 15, further comprising receiving remote control input of a flight path and position of the drone from the at least one remote lawyer.

19. The mobile lawyer method of claim 15, further comprising receiving remote control input of viewing angle direction for the at least one video camera from the at least one remote lawyer.

20. The mobile lawyer method of claim 15, wherein automatically determining a location of the user comprises accessing a GPS location of the user, and automatically identifying at least one remote lawyer licensed in a jurisdiction that matches the location of the user and matching additional filter criteria specified by the user.

* * * * *